M. R. BECKETT & W. J. RITTER.
PIE CRUST CRIMPER.
APPLICATION FILED JUNE 22, 1915.
1,181,725.
Patented May 2, 1916.
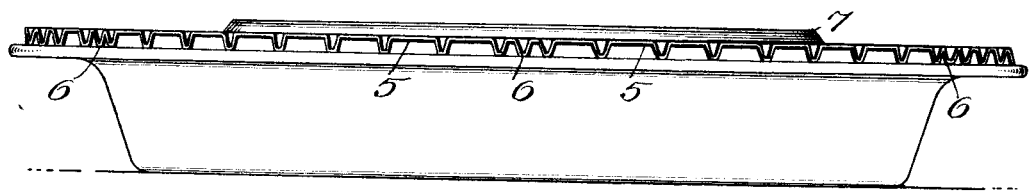
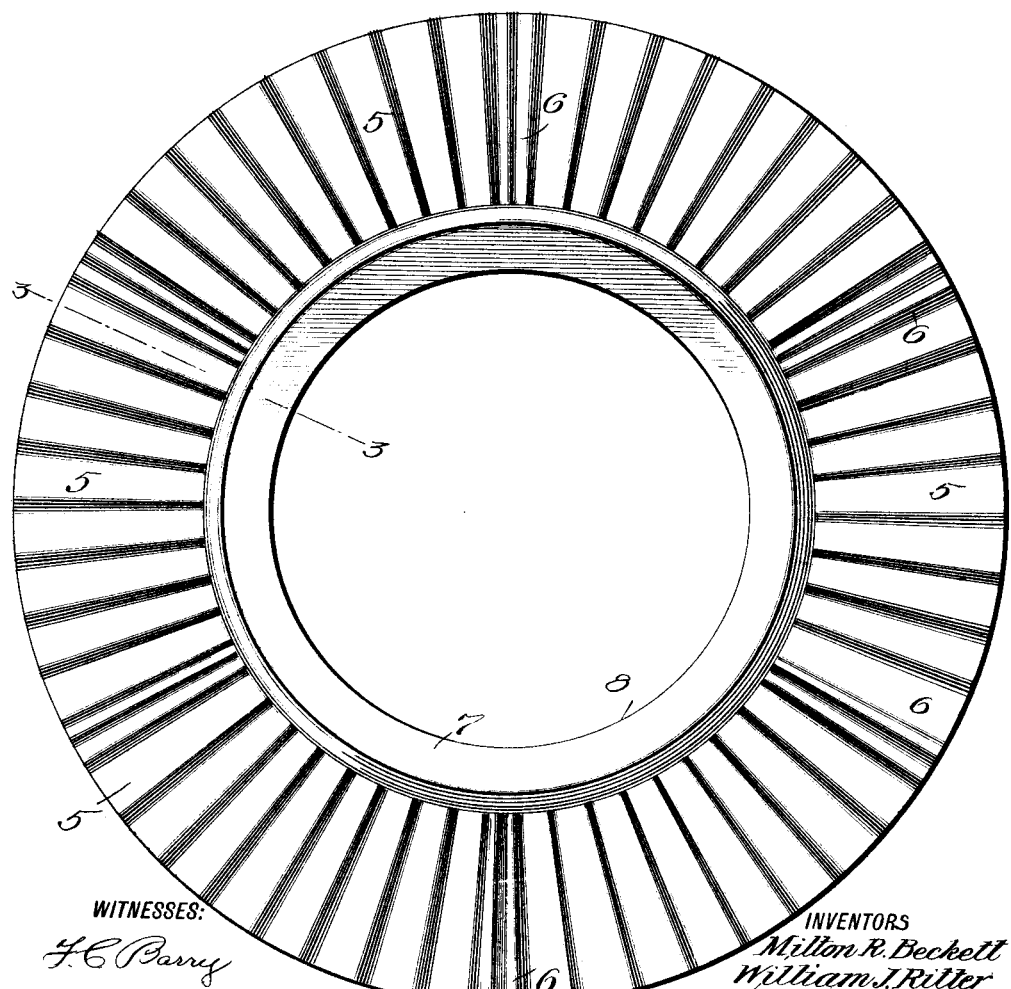
WITNESSES:
F. C. Barry
Alan F. Garner.
INVENTORS
Milton R. Beckett
William J. Ritter
BY Munn & Co.
ATTORNEYS

UNITED STATES PATENT OFFICE.

MILTON RAELIA BECKETT AND WILLIAM JOHN RITTER, OF CLARION, PENNSYLVANIA; SAID BECKETT ASSIGNOR TO SAID RITTER.

PIE-CRUST CRIMPER.

1,181,725.  Specification of Letters Patent.  Patented May 2, 1916.

Application filed June 22, 1915. Serial No. 35,731.

*To all whom it may concern:*

Be it known that we, MILTON R. BECKETT and WILLIAM J. RITTER, citizens of the United States, and residents of Clarion, in the county of Clarion and State of Pennsylvania, have invented a certain new and useful Improvement in Pie-Crust Crimpers, of which the following is a specification.

One of the principal objects of our invention is to provide an improved pie crust crimper of simple, strong, and durable design by means of which the crust of a pie may be readily and permanently crimped, and marked to indicate points at which cuts should be made for dividing the pie into equal parts, means being provided on the crimper for accommodating any bulging which might occur in the upper crust as a result of overfilling the pie.

A further object of the invention contemplates the provision of a crimping device which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 is a view in elevation of a pie crimper constructed according to our invention showing the same in operation. Fig. 2 represents a top plan view thereof. Fig. 3 represents a view in section taken vertically and radially on the plane indicated by the line 3—3 of Fig. 2.

In carrying out our invention we provide a crimper in the form of an annular plate having a marginal edge 5 which is provided with radially extending corrugations. At equidistant points of predetermined number the marginal portion 5 is provided with markers 6 in the nature of additional corrugations disposed at equi-spaced intervals from each other and arranged each between a pair of the adjacent regular corrugations.

The portion of the crimper lying within the marginal portion 5 thereof, is stamped upwardly as at 7 to lie in a plane above the plane of the marginal portion. An opening 8 of relatively large dimensions occurs at the central portion of the device. It will be noted that the corrugated marginal portion 5 is of relatively extensive width, in order that the crimper may be used in connection with pie pans of various diameters. Should a bulging of the upper crust of the pie occur by reason of excessive filling of the pie, it will be accommodated by the upwardly stamped inner portion 7 of the crimper.

In operation the crimper is placed over the pie after the crusts have been positioned in the pan and is then pressed downwardly thus crimping the marginal portions of the crusts overlying the flange of the pan and pressing the crusts together into a united mass. The crimper is then removed from the pie pan and the pie is ready for baking.

Such a device as we have provided is extremely simple, and at the same time is readily kept clean and sanitary and may be used with pie pans of various diameters. It will be noted that the upwardly stamped central portion 7 performs the double function of allowing for the reception of the bulging portion of the pie should there be any, and of strengthening the marginal portion 5 of the crimper so that the latter will be substantially rigid and strong.

Although we have described the preferred embodiment of our invention, we may desire to make such changes in the construction, combination and arrangement of parts thereof, as do not depart from the spirit of the invention and the scope of the appended claims.

We claim:—

1. A pie crimper comprising an annular plate having an outer relatively wide marginal portion provided with radially extending corrugations, markers provided at spaced intervals intermediate the corrugations, the inner portion of said plate being stamped upwardly to lie in a plane above the plane of the said marginal portion whereby to accommodate any bulging which may occur in the pie, and whereby to strengthen and rigidify the crimper.

2. A pie crimper comprising an annular plate having a relatively wide marginal portion provided with radially extending corrugations and further provided at spaced intervals with markers, said crimper having means for accommodating the bulging portion of a pie, said means adapted to render the crimper relatively rigid.

MILTON RAELIA BECKETT.
WILLIAM JOHN RITTER.

Witnesses:
J. C. McENTIRE,
B. R. M. SHEEDER.

Copies of this patent may be obtained for five cents each, by addressing the "Commissioner of Patents, Washington, D. C."